(12) United States Patent  
Sun et al.

(10) Patent No.: US 8,558,642 B2  
(45) Date of Patent: Oct. 15, 2013

(54) SPLITTER CIRCUITS FOR SEPARATING SIGNALS

(75) Inventors: Tao Sun, Shenzhen (CN); Hong-Zhou Lou, Shenzhen (CN)

(73) Assignee: Fu Tai Hua Industry (Shenzhen) Co., Ltd., Shenzhen (CN)

( * ) Notice: Subject to any disclaimer, the term of this patent is extended or adjusted under 35 U.S.C. 154(b) by 249 days.

(21) Appl. No.: 13/192,724

(22) Filed: Jul. 28, 2011

(65) Prior Publication Data

US 2012/0133456 A1   May 31, 2012

(30) Foreign Application Priority Data

Nov. 30, 2010   (CN) .......................... 2010 1 0565835

(51) Int. Cl.
*H03H 7/38*   (2006.01)
(52) U.S. Cl.
USPC ............................ 333/131; 333/119; 336/170
(58) Field of Classification Search
USPC .................................. 333/119, 131; 336/170
See application file for complete search history.

(56) References Cited

U.S. PATENT DOCUMENTS 5,073,762 A * 12/1991 Yu .................................. 333/112
6,542,047 B2 * 4/2003 Chen et al. .................... 333/119

* cited by examiner

*Primary Examiner* — Robert Pascal
*Assistant Examiner* — Kimberly Glenn
(74) *Attorney, Agent, or Firm* — Altis & Wispro Law Group, Inc.

(57) ABSTRACT

A splitter circuit for separating voice and data signals includes an input, a first output, a second output, a first inductance transformer, a second inductance transformer, a plurality of capacitors, and a plurality of resistors. The first inductance transformer and the second inductance transformer are connected in series. The second inductance transformer includes a core, a first coil winding, and a second coil winding. The first coil winding and the second coil winding are wound on the core and are connected in series. Two connecting terminals of the first inductance transformer are connected to the input, and two connecting terminals of the first coil winding are connected to the second output. Capacitors and the resistors are interconnected between the first inductance transformer and the second inductance transformer.

6 Claims, 1 Drawing Sheet

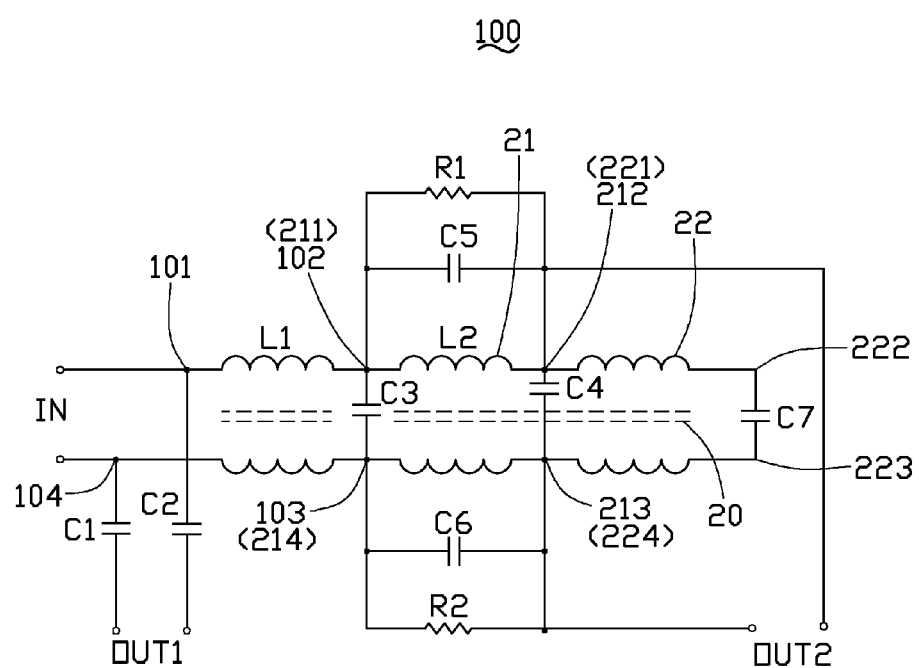

SPLITTER CIRCUITS FOR SEPARATING SIGNALS

BACKGROUND

1. Technical Field

The present disclosure generally relates to splitter circuits, and particularly, to a splitter circuit for separating a voice signal and a data signal.

2. Description of the Related Art

With the development of data services, ADSL (Asymmetric Digital Subscriber Loop) as the traditional telecom company's broadband access is widely used. For example, users can use one telephone line to simultaneously receive data signals and voice signals from an ISP (Internet service provider) via an ADSL network. The frequency of voice signals is generally from 20 Hz to 4 KHz, the frequency of data signals is generally from 25 KHz to 1104 KHz. The ADSL network needs a splitter circuit for completely separating the data signals from the voice signals to avoid interference between the data and voice signals.

Therefore, there is room for improvement within the art.

BRIEF DESCRIPTION OF THE DRAWING

The components in the drawings are not necessarily drawn to scale, the emphasis instead being placed upon clearly illustrating the principles of the present disclosure.

The FIGURE is a circuit diagram of a splitter circuit in an embodiment of the disclosure.

DETAILED DESCRIPTION

Referring to the FIGURE, an embodiment of a splitter circuit 100 for separating voice signals and data signals is shown. An input IN of the splitter circuit 100 is connected to a phone line. In this embodiment, the input IN is a phone plug. Voice signals and data signals are received by the splitter circuit 100 via the input IN, and access to an ADSL modem (not shown) takes place via a first output OUT1, and the composite input signal is transmitted through a low pass filter circuit formed by capacitors and inductances to isolate and block the high-frequency data signal, to access a second output OUT2 connected to a phone (not shown).

The splitter circuit 100 includes a first inductance transformer L1 and a second inductance transformer L2 connected in series. In the illustrated embodiment, the first inductance transformer L1 and the second inductance transformer L2 are conjugate coil inductances. The second inductance transformer L2 includes a core 20, a first coil winding 21, and a second coil winding 22. The first coil winding 21 and the second coil winding 22 are wound on the core 20 and are connected in series. Each of the first inductance transformer L1, the first coil winding 21, and the second coil winding 22 has four connecting terminals. The core 20 is an iron core in this embodiment.

A first connecting terminal 101 and a fourth connecting terminal 104 of the first inductance transformer L1 are connected to the input IN. A first connecting terminal 211 of the first coil winding 21 is connected to a second connecting terminal 102 of the first inductance transformer L1, and a fourth connecting terminal 214 of the first coil winding 21 is connected to a third connecting terminal 103 of the first inductance transformer L1. A first connecting terminal 221 of the second coil winding 22 is connected to a second connecting terminal 212 of the first coil winding 21, and a fourth connecting terminal 224 of the second coil winding 22 is connected to a third connecting terminal 213 of the first coil winding 21.

A first capacitor C1 interconnects the fourth connecting terminal 104 of the first transformer inductance L1 and the first output OUT1, and a second capacitor C2 interconnects the first connecting terminal 101 of the first inductance transformer L1 and the first output OUT1. A third capacitor C3 interconnects the first connecting terminal 211 of the first coil winding 21 and the third connecting terminal 103 of the first inductance transformer L1, and a fourth capacitor C4 interconnects the second connecting terminal 212 of the first coil winding 21 and the third connecting terminal 213 of the first coil winding 21. A first resistor R1 and a fifth capacitor C5 are connected in parallel between the first connecting terminal 211 and the second connecting terminal 212 of the first coil winding 21. A second resistor R2 and a sixth capacitor C6 are connected in parallel between the third connecting terminal 213 and the fourth connecting terminal 214 of the first coil winding 21. A seventh capacitor C7 is connected in series between a second connecting terminal 222 and a third connecting terminal 223 of the second coil winding 22. The second connecting terminal 212 and the third connecting terminal 213 of the first coil winding 21 are connected to the second output OUT2. By selecting the appropriate capacitances of capacitors C3, C4, C5, C6, C7, and the appropriate resistances for the first resistor R1 and the second resistor R2, the splitter circuit 100 can provide satisfactory impedance matching.

The splitter circuit 100 utilizes less capacitors and inductances to isolate and block the high-frequency digital signal, and the first coil windings 21 and the second coil windings 21 of the second inductance transformer L2 share the same core 20. Therefore, the splitter circuit 100 has lower manufacturing costs and occupies less space.

Through experimental comparison, the splitter circuit 100 exhibits good performance. For example, when the frequency of the input signal is from 200 Hz to 2.8 KHz, the low-frequency insertion loss of the splitter circuit 100 is in the range from −1.0 dB to +1.0 dB. When the frequency of the input signal is from 0.5 KHz to 2 KHz, the low-frequency return loss of the splitter circuit 100 is greater than 18 dB. When the frequency of the input signal is from 36 KHz to 500 KHz, the high-frequency insertion loss of the splitter circuit 100 is less than 3 dB. When the frequency of the input signal is from 500 KHz to 2.2 MHz, the high-frequency insertion loss of the splitter circuit 100 is less than 1 dB. When the frequency of the input signal is from 350 KHz to 1.5 MHz, the high-frequency attenuation of the splitter circuit 100 is greater than 55 dB. When the frequency of the input signal is from 1.5 MHz to 2.2 MHz, the high-frequency attenuation of the splitter circuit 100 is greater than 51 dB.

While the present disclosure has been described with reference to particular embodiments, the description is illustrative of the disclosure and is not to be construed as limiting the disclosure. Therefore, various modifications can be made to the embodiments by those of ordinary skill in the art without departing from the true spirit and scope of the disclosure as defined by the appended claims.

What is claimed is:

1. A splitter circuit for separating voice signals and data signals, comprising:
   an input;
   a first output;
   a second output;
   a first inductance transformer;

a second inductance transformer connected in series with the first inductance transformer and comprising a core, a first coil winding wound on the core, and a second coil winding wound on the core and connected in series with the first coil winding, a first connecting terminal and a fourth connecting terminal of the first inductance transformer being respectively connected to the input, a first connecting terminal of the first coil winding being connected to a second connecting terminal of the first inductance transformer, a fourth connecting terminal of the first coil winding being connected to a third connecting terminal of the first inductance transformer, a first connecting terminal of the second coil winding being connected to a second connecting terminal of the first coil winding, and a fourth connecting terminal of the second coil winding being connected to a third connecting terminal of the first coil winding, the second connecting terminal and the third connecting terminal of the first coil winding being respectively connected to the second output;
a first capacitor interconnected between the fourth connecting terminal of the first transformer inductance and the first output;
a second capacitor interconnected between the first connecting terminal of the first inductance transformer and the first output;
a third capacitor interconnected between the first connecting terminal of the first coil winding and the third connecting terminal of the first inductance transformer;
a fourth capacitor interconnected between the second connecting terminal of the first coil winding and the third connecting terminal of the first coil winding;
a first resistor and a fifth capacitor connected in parallel between the first connecting terminal and the second connecting terminal of the first coil winding;
a second resistor and a sixth capacitor connected in parallel between the first connecting terminal and the third connecting terminal and the fourth connecting terminal of the first coil winding; and
a seventh capacitor connected in series between a second connecting terminal and a third connecting terminal of the second coil winding.

2. The splitter circuit of claim 1, wherein the first inductance transformer and the second inductance transformer are conjugate coil inductances.

3. The splitter circuit of claim 1, wherein the core is an iron core.

4. A splitter circuit for separating voice signal and data signal, comprising:
an input;
a first output;
a second output;
a first inductance transformer;
a second inductance transformer connected in series with the first inductance transformer and comprising a core, a first coil winding wound on the core, and a second coil winding wound on the core and connected in series with the first coil winding, two connecting terminals of the first inductance transformer being respectively connected to the input, two connecting terminals of the first coil winding being respectively connected to the second output;
a first capacitor interconnected between the first transformer inductance and the first output;
a second capacitor interconnected between the first inductance transformer and the first output;
a third capacitor interconnected between the first coil winding and the first inductance transformer;
a fourth capacitor interconnected between the first coil winding and the first coil winding;
a first resistor and a fifth capacitor connected in parallel between the two connecting terminals of the first coil winding;
a second resistor and a sixth capacitor connected in parallel between another two connecting terminals of the first coil winding; and
a seventh capacitor connected in series between two connecting terminals of the second coil winding.

5. The splitter circuit of claim 1, wherein the first inductance transformer and the second inductance transformer are conjugate coil inductances.

6. The splitter circuit of claim 1, wherein the core is an iron core.

* * * * *